US012505587B2

(12) United States Patent
Allinson et al.

(10) Patent No.: US 12,505,587 B2
(45) Date of Patent: Dec. 23, 2025

(54) SHOW EFFECT SYSTEM FOR AMUSEMENT PARK ATTRACTION SYSTEM

(71) Applicant: Universal City Studios LLC, Universal City, CA (US)

(72) Inventors: Jacob David Allinson, Orlando, FL (US); Mark James Traynor, Orlando, FL (US); Robert Michael Jordan, Orlando, FL (US); Thomas Owen Williams, Orlando, FL (US); Eric To Chan, Kissimmee, FL (US); Peter Carsillo, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 105 days.

(21) Appl. No.: 18/233,669

(22) Filed: Aug. 14, 2023

(65) Prior Publication Data

US 2024/0054693 A1 Feb. 15, 2024

Related U.S. Application Data

(60) Provisional application No. 63/398,054, filed on Aug. 15, 2022.

(51) Int. Cl.
| | | |
|---|---|---|
| *G06T 11/00* | (2006.01) | |
| *A63G 31/16* | (2006.01) | |
| *G06V 10/764* | (2022.01) | |
| *G06V 10/776* | (2022.01) | |
| *G06V 20/20* | (2022.01) | |

(52) U.S. Cl.
CPC .............. *G06T 11/00* (2013.01); *A63G 31/16* (2013.01); *G06V 10/764* (2022.01); *G06V 10/776* (2022.01); *G06V 20/20* (2022.01)

(58) Field of Classification Search
CPC ...... G06T 11/00; A63G 31/16; G06V 10/764; G06V 10/776; G06V 20/20
See application file for complete search history.

(56) References Cited

U.S. PATENT DOCUMENTS

| 9,933,624 B1 | 4/2018 | White et al. |
| 11,776,203 B1* | 10/2023 | Krol .................. G06T 15/20 |
| | | 345/426 |
| 2016/0048203 A1* | 2/2016 | Blum .................. A63G 21/00 |
| | | 104/84 |

(Continued)

FOREIGN PATENT DOCUMENTS

| EP | 2983955 B1 | 6/2019 |
| WO | 2010006387 A2 | 1/2010 |

OTHER PUBLICATIONS

Radke, Richard, "CVPR 2015 Tutorial," Computer Vision for Visual Effects, May 27, 2015, cvfxbook.com/cvpr2015/.

(Continued)

*Primary Examiner* — Jitesh Patel
(74) *Attorney, Agent, or Firm* — Fletcher Yoder, P.C.

(57) ABSTRACT

A system for an attraction includes a sensor configured to capture imagery of a real world environment and a control system communicatively coupled to the sensor. The control system is configured to receive the imagery captured by the sensor, identify a real world element of the imagery, generate image data that includes a virtual element that corresponds to the real world element, and transmit the image data for presentation in the attraction.

20 Claims, 8 Drawing Sheets

(56) References Cited

U.S. PATENT DOCUMENTS

| | | |
|---|---|---|
| 2017/0323482 A1* | 11/2017 | Coup .................... H04N 13/383 |
| 2017/0345198 A1 | 11/2017 | Magpuri et al. |
| 2018/0204562 A1* | 7/2018 | Gong ...................... G06V 10/82 |
| 2018/0250589 A1 | 9/2018 | Cossairt et al. |
| 2018/0293909 A1* | 10/2018 | Lechner ................. G09B 9/006 |
| 2018/0350144 A1 | 12/2018 | Rathod |
| 2019/0206132 A1* | 7/2019 | Zielkowski ............. G06F 3/011 |
| 2020/0151768 A1 | 5/2020 | DeKeyser et al. |
| 2020/0265604 A1* | 8/2020 | Lin ....................... G06V 40/161 |
| 2020/0376961 A1* | 12/2020 | Kleen ................ G02B 27/0101 |
| 2022/0254161 A1* | 8/2022 | Tatrai ..................... G06V 20/53 |

OTHER PUBLICATIONS

PCT/US2023/030279 International Search Report and Written Opinion mailed Nov. 29, 2023.

* cited by examiner

SHOW EFFECT SYSTEM FOR AMUSEMENT PARK ATTRACTION SYSTEM

CROSS-REFERENCE TO RELATED APPLICATION

This application claims priority to and the benefit of U.S. Provisional Application No. 63/398,054, entitled "SHOW EFFECT SYSTEM FOR AMUSEMENT PARK ATTRACTION SYSTEM" and filed Aug. 15, 2022, which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction. Immersive environments may include three-dimensional (3D) props and set pieces, robotic or mechanical elements, and/or display surfaces that present media. In addition, the immersive environment may include audio effects, smoke effects, and/or motion effects. Thus, immersive environments may include a combination of dynamic and static elements. However, implementation and operation of special effects may be complex. For example, it may be difficult to operate certain elements of the special effects in a desirable manner to create the immersive environment. With the increasing sophistication and complexity of modern ride attractions, and the corresponding increase in expectations among guests, improved and more creative attractions are desirable, including ride attractions having special effects to provide the immersive environment.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a system for an attraction includes a sensor configured to capture imagery of a real world environment and a control system communicatively coupled to the sensor. The control system is configured to receive the imagery captured by the sensor, identify a real world element of the imagery, generate image data that includes a virtual element that corresponds to the real world element, and transmit the image data for presentation in the attraction.

In an embodiment, a non-transitory, computer-readable medium includes instructions that, when executed by processing circuitry, cause the processing circuitry to receive captured imagery, identify a first type or a first population density of a real world element in the captured imagery, generate image data having a virtual element corresponding to the first type or the first population density, and outputting the image data for presentation.

In an embodiment, a system includes a display configured to present images and a control system configured to perform operations including receiving imagery of a real world environment, identifying visual characteristics of real world objects in the imagery, generating image data that includes a virtual object and an additional virtual object that corresponds to the visual characteristics of the real world objects, and transmitting the image data to the display.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
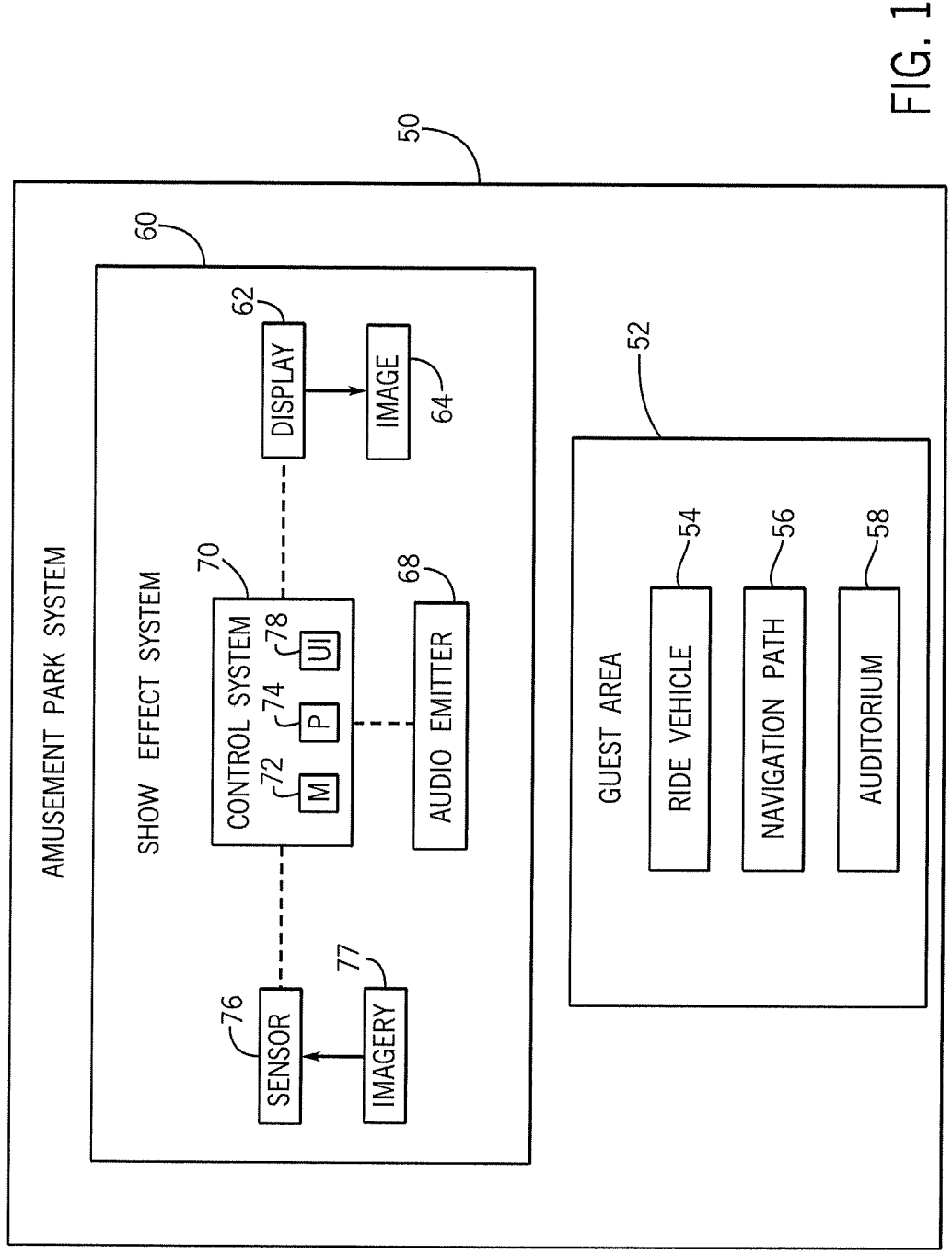
FIG. 1 is a schematic diagram of an embodiment of an amusement park system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to a system of an amusement park. The amusement park may include various attraction systems, such as a ride (e.g., a roller coaster, a water ride, a drop tower), a performance show, a walkway, and so forth, with features that may entertain guests at the amusement park. The amusement park may also include a show effect system configured to operate to present various effects, such as visual effects and/or audio effects, to the guests. For example, the show effect system may be a part of an attraction system and present special effects to guests within the attraction system, such as guests within a ride vehicle of the attraction system, at a queue of the attraction system, in an auditorium of the attraction system, and the like. Additionally, or alternatively, the show effect system may be external to any attraction system and may, for instance, present show effects to guests at a pathway, a dining area, a souvenir shop, and so forth of the amusement park. The show effect system may provide an immersive environment for the guests to entertain the guests.

It may be desirable to present more realistic show effects for guests in order to provide a more realistic environment and improve the experience provided to the guests. For example, it may be desirable to display digital or virtual elements or objects that are similar to real world elements or objects of a surrounding environment. In this way, the show effect system may provide an environment that more closely reflects the surrounding real world environment. As such, the show effect system may establish a more realistic environment for the guests and improve the immersive experience provided by the show effect system.

Thus, embodiments of the present disclosure are directed to a show effect system that may receive captured imagery of a real world environment and present an image based on the captured imagery. For instance, the show effect system may include a control system that may identify one or more real world elements of the captured imagery. The control system may then generate image data having virtual elements that correspond to the identified one or more real world elements. For example, corresponding to the identified one or more real world elements may include mimicking, representing, modeling, simulating, and/or complementing the identified one or more real world elements. The control system may transmit the image data to a device, such as to a projector and/or a display device, to present an image based on the image data. In some embodiments, the modelling (e.g., simulation) of real world elements via virtual elements may cause the presented image to closely represent a real world environment associated with the captured imagery. For instance, the virtual elements image presented by the show effect system may have an appearance similar to that of the captured imagery of the real world elements. Additionally or alternatively, the virtual elements may correspond to detected features (e.g., characteristics, visual characteristics) of the real world elements within the captured imagery, such as density, movement, size, geometry (e.g., shape), color, etc. As such, the virtual elements may correspond to the characteristics of the real world elements, and thus appear to be visually similar to the real world elements, though, in some embodiments, the virtual element may not match a type of the real world element. Thus, the image may blend into the real world environment and may provide a seamless transition between the real world environment and the effects provided by the show effect system. As such, the show effect system may provide the guests with a more realistic and/or immersive environment that corresponds to the real world environment.

With the preceding in mind, FIG. 1 is a schematic diagram of an embodiment of an amusement park system 50. As an example, the amusement park system 50 may be a part of an attraction system, such as a ride (e.g., a roller coaster, a dark ride), a performance show, and the like. As another example, the amusement park system 50 may be a part of a dining venue, a waiting area, a walkway, a shopping venue (e.g., a gift shop), or any other suitable part of an amusement park. The amusement park system 50 may include a guest area 52 where guests may be located. For instance, the guest area 52 may include a ride vehicle 54, which may move and change its position, location, and/or orientation within the amusement park system 50. The guest area 52 may additionally, or alternatively, include a navigation path 56 used by the guests to navigate (e.g., walk) through the amusement park system 50, such as outside of the ride vehicle 54. The guest area 52 may further include an auditorium 58, which may include arrangements, such as seating areas and/or standing areas, where guests may be positioned. Indeed, the guest area 52 may include any suitable feature to accommodate the guests within the amusement park system 50.

The amusement park system 50 may also include a show effect system 60 configured to provide entertainment to the guests of the guest area 52. For example, the show effect system 60 may include a display 62 configured to present an image 64 that is visible to the guests. The display 62 may be a light emitting diode (LED) display, a liquid crystal display (LCD), a plasma display, an electronic paper display, a cathode ray tube (CRT) display, and so forth, configured to output the image. Additionally, or alternatively, the display 62 may include a projector configured to output the image onto a surface for presentation to the guests. The display 62 may be a part of a prop, such as an animated figure, a structure (e.g., a wall, a ceiling, a floor), or any other suitable part of the amusement park system 50. The guests may view the image 64 output by the display 62. Thus, the show effect system 60 may provide visual effects to the guests. By way of example, the image 64 output by the display 62 may include virtual or digital elements that correspond to real world elements to immerse the guests in a realistic or semi-realistic environment. By way of further example, the image 64 output by the display 62 may include virtual or digital elements that mimic or simulate real world elements to immerse the guests in a realistic or semi-realistic environment.

Furthermore, the display 62 may include a receiver and/or a transceiver configured to receive image data. In particular, the display 62 may receive the image data via the transmitter and/or transceiver from the control system 70 (e.g., the processing circuitry 74, via the transmitter and/or transceiver). In some embodiments, the display 62 may be communicatively coupled to a receiver and/or a transceiver. As such, the display 62 may receive data via the communicatively coupled receiver and/or transceiver. For example, the control system 70 may send image data via a transmitter and/or transceiver to the display 62, and the display 62 may receive the image data via the communicatively coupled receiver and/or transceiver.

The show effect system 60 may also be configured to provide other types of effects to the guests. For instance, the show effect system 60 may also include an audio emitter 68, such as speakers, to provide audio effects that complement the image 64 provided by the display 62. In an example, the image 64 provided by the display 62 may simulate rain and lightning, and the audio effects provided by the audio emitter 68 may simulate thunder. In this example, the display 62 and the audio emitter 68 may collectively provide a realistic stormy environment to the guests. The show effect system 60 may additionally include other types of show effect features and/or components, such as a fog emitter, a fan, lighting, an animated figure, a prop, an actuated member, a fragrance diffuser, a flame emitter, a smoke emitter, pyrotechnics, a water emitter, and so forth.

The show effect system 60 may further include a control system 70 (e.g., a controller, an automation controller, a programmable controller, an electronic controller, control circuitry) configured to operate components of the show effect system 60, such as the display 62 and/or the audio emitter 68. The control system 70 may include a memory 72 and processing circuitry 74. The memory 72 may include volatile memory, such as random access memory (RAM), and/or non-volatile memory, such as read-only memory (ROM), optical drives, hard disc drives, solid-state drives, or any other non-transitory computer-readable medium that includes instructions to operate the amusement park system 50. The processing circuitry 74 may be configured to execute such instructions. For example, the processing circuitry 74 may include one or more application specific integrated circuits (ASICs), one or more field programmable gate arrays (FPGAs), one or more general purpose processors, or any combination thereof. Furthermore, the control system 70 may include a transmitter and/or a transceiver configured to transmit image data. In particular, the control system 70 may transmit (e.g., output, send) the image data via the transmitter and/or transceiver to the display 62. In some embodiments, the control system 70 (e.g., the processing circuitry 74) may be communicatively coupled to a transmitter, a transceiver, and/or a receiver. As such, the control system 70 may send (e.g., output, transmit) data via the communicatively coupled transmitter and/or transceiver and/or receive data via the communicatively coupled receiver and/or transceiver. For example, the control system 70 may send image data via the communicatively coupled transmitter and/or transceiver (e.g. to the display 62), and/or receive image data via the communicatively coupled receiver and/or transceiver (e.g., from the sensor 76).

In addition, the control system 70 may, for example, operate the display 62 to control the image 64 output by the display 62. In an embodiment, the control system 70 may transmit image data to the display 62 for output as the image 64. For example, the control system 70 may transmit image data to cause the display 62 to output an image 64 that corresponds to a real world element in a surrounding environment of the show effect system 60 and/or the guest area 52. As a further example, the control system 70 may transmit image data to cause the display 62 to output an image 64 that mimics or simulates a real world element in a surrounding environment of the show effect system 60 and/or the guest area 52. In one embodiment, the control system 70 may identify a real world element in the surrounding environment, generate image data that includes virtual elements (e.g., primary virtual elements) corresponding to (e.g., representing, mimicking, modeling, simulating, complementing) the real world element, and transmit the image data to the display 62 to cause the display 62 to output the image 64 based on the image data. Thus, the image 64 presented by the display 62 may include the virtual elements that correspond to (e.g., mimic, represent, model, simulate, complement) the real world element. By way of example, mimicry of the real world element via the virtual elements may cause the image 64 to appear to blend into the surrounding environment from the perspective of the guests. In this manner, the guests may be immersed within an environment that seamlessly transitions between the environment (e.g., a virtual environment) provided by the show effect system 60 and the real world environment surrounding the amusement park system 50. Therefore, the environment provided by the show effect system 60 may appear to be more realistic. For example, a guest transitioning from an outdoor portion of a queue may not fully realize that indoor imagery provided by the display 62 is not the outdoor environment, because real weather and/or foliage patterns may be mimicked in the generated imagery based on detection of outdoor conditions. This allows for introduction of desired illusions (e.g., a sun or moon with human features or a flying pig passing through an otherwise realistic sky) in the imitation environment that feel consistent with the real outdoor environment.

The show effect system 60 may include a sensor 76 communicatively coupled to the control system 70. The sensor 76 may be configured to provide data (e.g., sensor data) indicative of the surrounding environment to the control system 70. For instance, the sensor 76 may include an optical sensor, such as a camera, configured to capture imagery 77 (e.g., one or more images) of the surrounding environment, and the data provided to the control system 70 may include the captured imagery 77. In some embodiments, the sensor 76 may detect characteristics associated with the surrounding environment (e.g., cloud and/or foliage shapes, movement, and respective positioning). In particular, the sensor 76 may detect temperature (e.g., heat), amount of light (e.g., sunlight), frequency and/or wavelength of electromagnetic radiation, moisture (e.g., humidity), pressure, or any combination thereof, of the surrounding environment. For example, the sensor 76 may include a temperature sensor and/or light sensor. In such embodiments, the sensor 76 may detect a temperature, moisture, sound, barometric pressure, amount of light (e.g., intensity, brightness), and/or other characteristics of the surrounding environment. Such data (e.g., data associated with the temperature and/or amount of light) may be provided to the control system 70. As such, the control system 70 may be provided with data that may indicate weather conditions (e.g., rainy, sunny, hot, cold, overcast) of the surrounding environment. Additionally or alternatively, the control system 70 may receive the characteristics associated with the surrounding environment, such as weather conditions, time of day, time of year (e.g., season), temperature, or any combination thereof, from an external source. The external source may be, for example, a weather service, an external database, global positioning services (GPS), Network Time Protocol (NTP), or any combination thereof.

Continuing with FIG. 1, the control system 70 may identify one or more real world elements within the captured imagery 77 and generate image data based on the identified real world elements. Real world elements may include any aspect of the environment captured by the sensor 76 or detected in the data output of the sensor 76 (e.g., the data output of the sensor may include imagery 77). Real world elements may be categorized by types of real world elements, wherein types of real world elements may include plants (e.g., trees, flowers), animals, people, man-made structures (e.g., buildings, roads, bridges), terrain (e.g., mountains, hills, rocks, sand), or other aspects of the real world. As an example, as described herein, the control system 70 may determine a type of the real world elements (e.g., trees) in the captured imagery 77 and generate image data (e.g., computer-generated graphics of trees) that includes virtual elements having an appearance matching the type of the real world elements in the image 64. Additionally or alternatively, in some embodiments, the control system 70 may identify (e.g., determine) a characteristic and/or feature associated with the identified real world element from the captured imagery 77, and generate the image data that includes virtual elements with virtual characteristics (e.g., visual characteristics) based on the identified characteristic and/or feature of the real world element. As an example, the control system 70 may identify a real world element as including a tree and identify one or more characteristics (e.g., visual patterns) associated with the tree, such as a size, shape, movement, coloration, etc., of the tree. As in this example, the control system 70 may identify the characteristics as being relatively tall, swaying (e.g., such as being moved by wind), and/or relatively thin along a trunk of the tree. Furthermore, the control system 70 may generate the image data that includes virtual elements having similar virtual characteristics as the identify characteristics associated with the real world element. In other words, the virtual elements may include stylistic renderings of the real world elements, such that the overall patterns and/or characteristics of the virtual element matches the detected patterns and/or characteristics of the real world element, though the virtual element may be of a different type than the real world element. Continuing with the example, a virtual element may include a dinosaur with a long neck, and the dinosaur may include visual patterns and/or characteristics that correspond with the identified characteristics (e.g., relatively tall, swaying, and/or relatively thin) associated with the tree within the captured imagery 77. As such, the displayed image 64 may include virtual elements, such as the dinosaur, having a similar appearance as the identified real world elements, such as the tree. In another example, cloud shapes and arrangements may be emulated with depictions of butterflies. As an additional example, additionally or alternatively, a virtual element may include a dinosaur with a long neck, and the dinosaur's long neck may correspond with the identified characteristic (e.g., relatively tall) associated with the tree within the captured imagery 77 (e.g., the dinosaur may then be further depicted reaching and/or eating leaves from trees of similar size as the tree from the captured imagery 77). In another example, the control system may be able to identify objects from the imagery 77 captured by the sensor 76 using object detection and/or identification. Further, the control system 70 may instruct outputs in addition to or alternatively to visual output based on the identification of certain objects (e.g., certain objects within the imagery 77). For example, if the control system identifies a rose (e.g., identifies a rose in the imagery 77), the control system 70 may instruct a scent diffuser to emit a scent of a rose. As another example, if the control system identifies a tree (e.g., identifies a tree within the imagery 77) with many leaves being blown by wind, the control system 70 may instruct an audio emitter 68 to output the sound of leaves of a tree being blown by wind.

Artificial intelligence, learning algorithms, and the like may be employed to generate graphics that closely resemble the real world elements. As another example, the control system 70 may determine a quantity or density (e.g., a population density of clouds, rocks, mountains, or foliage) of the real world elements within the captured imagery 77 and generate image data that includes a similar quantity or density of virtual elements contained within the image 64. In this manner, the control system 70 may utilize machine vision to present the image 64 having virtual elements that may closely correspond to an appearance of the real world environment, as indicated by the imagery 77 received from the sensor 76. In some embodiments, the control system 70 may utilize the characteristics (e.g., received and/or detected characteristics) associated with the surrounding environment in combination with the captured imagery 77 to generate the image data. The characteristics may enhance the generated image data and provide for an increase in similarity between the surrounding environment and the resulting image 64 and/or virtual elements contained within the image 64. As such, virtual characteristics of the image 64 may more closely correspond to actual physical characteristics (e.g., a reality, an appearance, a real life experience) of the surrounding environment (e.g., real world environment). The control system 70 may also be configured to operate the audio emitter 68 and other components of the show effect system 60 based on the data received from the sensor 76, such as to provide an audio effect to the guests to simulate aspects of the surrounding environment.

In an embodiment, the control system 70 may also include a user interface (UI) 78 with which a user, such as an operator, a guest, a technician, and so forth of the amusement park system 50, may interact to operate the control system 70. For instance, the user may utilize the UI 78 to adjust the image 64 output by the display 62 and/or the audio effects output by the audio emitter 68. By way of example, the user may change an appearance of the virtual elements that correspond to (e.g., mimic, represent, model, simulate, complement) the real world elements, such as by changing the virtual elements to correspond to (e.g., mimic, represent, model, simulate, complement) a different type and/or class of real world elements, changing the quantity of the virtual elements, changing other virtual elements (e.g., secondary virtual elements) that do not correspond to (e.g., mimic, represent, model, simulate, complement) the determined real world elements, and so forth. A class of real world element may include a specific variety of a type of real world element. For example, classes of the real world element tree may include birch tree, maple tree, and/or orange tree. In this manner, the control system 70 may adjust the image data provided to the display 62 based on the interaction with the UI 78 to change the image 64 output by the display 62, such as to change the appearance of virtual elements of the image 64 generated based on the data received from the sensor 76. Thus, the control system 70 may also be configured to provide a more customizable experience for the guests. As a specific example, while the generated environment mimics the lighting, trees, and other environmental features of the real outside environment, certain graphics (e.g., a graphic of a unique tree or bird) may be displayed that achieves a goal of the themed environment (e.g., furthers a narrative).

Figure 2:
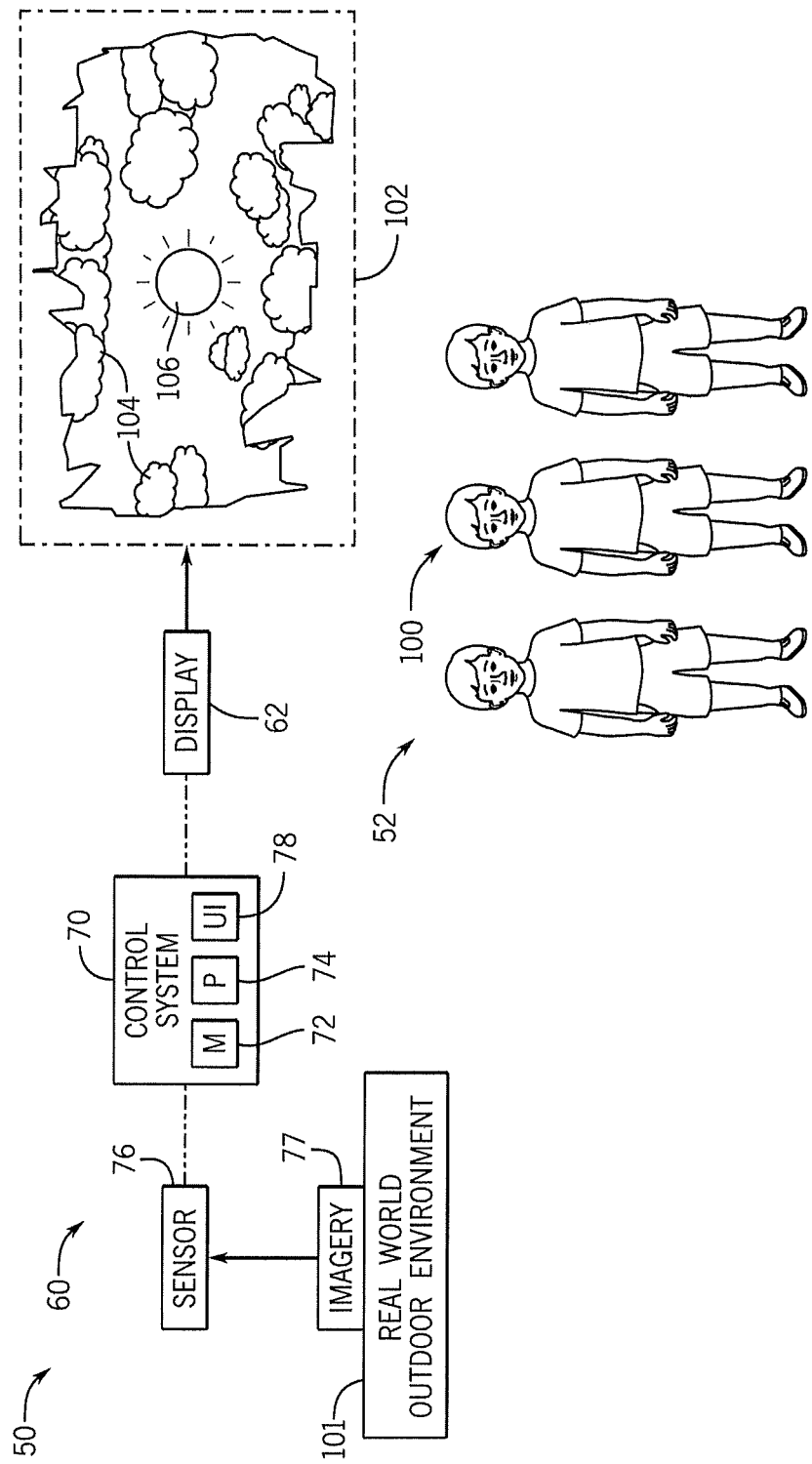
FIG. 2 is a schematic diagram of an embodiment of an amusement park system, in accordance with an aspect of the present disclosure.

FIG. 2 is a schematic diagram of the amusement park system 50 having the show effect system 60 and the guest area 52. In the illustrated embodiment, the guest area 52 includes multiple guests 100. The guest area 52 may, for example, be a part of an attraction system having a themed elements (e.g., props) that simulates an environment. For instance, the guest area 52 may include a pathway, such as a queue, that the guests 100 may navigate within the attraction system. In an embodiment, the attraction system may include an outdoor area and an indoor area through which the pathway may extend. In the outdoor area, the guests may be within a real world outdoor environment 101. In the indoor area, the guests may be immersed in a virtual or simulated environment provided by the show effect system 60. As an example, the show effect system 60 may present an image 102 that corresponds to (e.g., mimics, represents, models, simulates, complements) the real world outdoor environment 101 and realistically portrays a digital scene with real world elements of the real world outdoor environment 101. Thus, the respective environments associated with the outdoor area and the indoor area may seamlessly blend with one another to provide an appearance that the guests 100 are still immersed in the real world outdoor environment 101 while navigating the indoor area of the amusement park system 50. For example, as the guests 100 transition from the outdoor area to the indoor area, the image 102 created and/or presented by the show effect system 60 may provide an impression to the guests 100 that they are still in the outdoor area while also providing graphical elements of special interest (e.g., animated birds in a graphic sky that mimics the real sky). Although the present disclosure discusses generating image data, generating the image 102, and/or displaying the image 102 corresponding to (e.g., mimicking, representing, modeling, simulating, complementing) the real world outdoor environment 101 via the show effect system 60, it should be noted that the image 102 provided by the show effect system 60 may correspond to (e.g., mimic, represent, model, simulate, complement) any other suitable real world environment, such as a crowd with people, a room within a building or other structure, and the like.

In the illustrated embodiment, the image 102 output by the display 62 provides a digital scene that simulates an appearance of an outdoor sky. For example, the virtual elements of the image 102 may include virtual clouds 104 and an additional virtual element, such as a virtual sun 106. Thus, to simulate realistic portrayal of the virtual clouds 104 and the virtual sun 106, the image 102 may be output at a location that is positioned above the guests 100. In this way, the guests 100 may see the virtual clouds 104 and the virtual sun 106 as being positioned at realistic locations corresponding to the outdoor sky, thereby providing a realistic appearance that the image 102 is a part of the real world outdoor environment 101 rather than a projection via the show effect system 60. As an example, the display 62 may be a part of a wall, a screen, a ceiling portion, or any other suitable part of the amusement park system 50 positioned above the guests 100. In an additional or alternative embodiment, such as an embodiment in which the image 102 may simulate different real world elements, the image 102 may be output at a position that is at any other suitable relation with respect to the guests 100. For instance, an image 102 that corresponds to (e.g., mimics, represents, models, simulates, complements) real life underwater or underground elements may be positioned below the guests 100, such as via a display on top of which the guests 100 be positioned.

The control system 70 may transmit image data to the display 62 to output the image 102 having the virtual clouds 104 and/or the virtual sun 106 presented in a particular manner to correspond to the real world outdoor environment 101. For example, the control system 70 may receive data from the sensor 76, such as data that includes captured imagery 77 of the real world outdoor environment 101 (e.g., the sky). The control system 70 may receive the captured imagery 77 and determine a class of real world clouds included in the captured imagery 77. For example, machine learning may allow the control system 70 to identify changing cloud classes throughout the day. The control system 70 may then generate image data that causes the display 62 to output the image 102 that includes the virtual clouds 104 of the same class as that of the real world clouds identified in the captured imagery 77 received from the sensor 76. Additionally or alternatively the control system 70 may generate image data (e.g., image data corresponding to an image 102), and the control system may then instruct display 62 to output the image 102 based on the image data. Additionally, or alternatively, the control system 70 may determine a population density of the real world clouds, or a quantity of real world clouds in a particular area in the captured imagery 77, and the control system 70 may generate image data that causes the display 62 to output the image 102 having the virtual clouds 104 distributed in a similar population density. The control system 70 may further determine a position of the real world sun and/or a position of the real world clouds relative to the real world sun in the captured imagery 77, and the control system 70 may generate image data that causes the display 62 to output the image 102 having the virtual clouds 104 and/or the virtual sun 106 positioned relative to one another in a similar manner. Thus, the virtual clouds 104 may correspond to (e.g., mimic, represent, model, simulate, complement) the appearance of real world clouds, and the image 102 visible to the guests 100 may more closely portray the sky of the real world outdoor environment 101. Furthermore, in some embodiments, the control system 70 may receive and/or determine (e.g., using machine learning) updated one or more characteristics associated with the one or more real world elements based on updated receive data from the sensor 76 that includes updated captured imagery 77 of the real world outdoor environment 101. For example, the control system 70 may identify an updated position of a real world element based on the updated data from the sensor 76, and determine a corresponding updated position of the virtual element that is associated with the real world element. Moreover, the control system 70 may modify the image data by modifying a position of the virtual element (e.g., with respect to the digital scene) such that the updated position of the virtual element corresponds to (e.g., matches, mimics, models, simulates) the updated positioning (e.g., updated characteristics) of the real world element identified within the captured imagery 77.

As briefly discussed herein, in some embodiments, the sensor 76 may detect characteristics (e.g., physical characteristics) associated with the real world outdoor environment 101. In particular, the sensor 76 may detect temperature (e.g., heat), amount of light (e.g., sunlight), moisture (e.g., humidity), pressure, or any combination thereof, of the real world outdoor environment 101. For example, the sensor 76 may include a temperature sensor and/or light sensor. In such embodiments, the sensor 76 may detect a temperature of the real world outdoor environment 101 and/or an amount of light in the real world outdoor environment 101. The data associated with the detected temperature and/or detected amount of light may be provided by the sensor 76 to the control system 70. As such, the control system 70 may receive data from the sensor 76 that may indicate weather conditions associated with the real world outdoor environment 101 (e.g., rainy, sunny, hot, cold, overcast). Additionally or alternatively, the control system 70 may receive the characteristics associated with the real world outdoor environment 101, such as weather conditions, time of day, time of year (e.g., season), temperature, or any combination thereof, from an external source. The external source may be, for example, a weather service, a database, global positioning services (GPS), Network Time Protocol (NTP), or any combination thereof, that is communicatively coupled to the show effect system 60.

Furthermore, the control system 70 may utilize the characteristics (e.g., received and/or detected characteristics) associated with the real world outdoor environment 101 in combination with the imagery 77 to generate the image 102.

The characteristics may enhance the generated image 102 and provide for an increase in similarity between the real world outdoor environment 101 and the resulting image 102 and/or virtual elements contained within the image 102. As such, virtual characteristics of the image 102 may more closely correspond to actual physical characteristics (e.g., a reality, an appearance, a real life experience) of the real world outdoor environment 101, and the image 102 visible to the guests 100 may more closely portray aspects of the real world outdoor environment 101.

By displaying virtual elements based on the imagery 77 of the real world outdoor environment 101, the show effect system 60 may immerse the guests 100 in a more realistic environment representative of the real world outdoor environment 101. Additionally, the show effect system 60 may portray more desirable imagery to the guests 100 by generating the virtual elements instead of, for example, directly depicting the imagery 77 captured by the sensor 76. For example, the imagery 77 captured by the sensor 76 may include various real world elements that may not be desirable for display to the guests 100. With respect to the imagery 77 captured of the outdoor sky, such real world elements may include, for instance, an aircraft, an animal, an element (e.g., mist, lighting) within the amusement park (e.g., from a nearby attraction system), and the like. As such, the image 102 provided by the show effect system 60 may more desirably portray the real world outdoor environment 101 to immerse the guests 100 in a realistic environment.

Although the present disclosure discusses adjusting the virtual clouds 104 and/or the virtual sun 106 of an output image in the embodiments described herein, any other virtual element may be adjusted in an additional or alternative embodiment. For example, an appearance of the moon in an image may be adjusted based on a determined appearance (e.g., illumination, crater appearance) of the moon in the captured imagery 77, an appearance of precipitation in an image may be adjusted based on a determined precipitation (e.g., a class of precipitation, a size of precipitation) occurring in the captured imagery 77, an appearance of humanoid objects (e.g., a robot) in an image may be adjusted based on a determined appearance (e.g., a facial feature) of the guests 100 in the captured imagery 77, an appearance of trees in an image may be adjusted based on a class and/or a population density of trees in the captured imagery 77, and so forth.

In addition, in some embodiments, the show effect system 60 may utilize the characteristics (e.g., received and/or detected characteristics) associated with the real world outdoor environment 101 to modify the image 102 and/or a virtual element of the image 102 presented to the guests 100. For example, the control system 70 may receive data indicating that physical characteristics (e.g., current physical characteristics, real-time physical characteristics) of the real world outdoor environment 101 are that it is relatively hot and sunny (e.g., via a temperature and/or light sensor). As a result, the show effect system 60 may adjust the image 102 and/or a virtual element in the image 102 based on the received physical characteristics. As an example, a virtual element of the image 102 may include a human-like figure, and the show effect system 60 may portray the human-like figure to be squinting, sweating, fanning itself, shading itself, speaking about a hot weather environment, or any combination thereof.

Additionally or alternatively, as briefly discussed herein, the show effect system 60 may include an animated figure (e.g., a prop, robot) viewable by the guest 100 within the amusement park system 50. As such, in some embodiments, the show effect system 60 may utilize the characteristics (e.g., received and/or detected characteristics) associated with the real world outdoor environment 101 to operate (e.g., control, send instructions to, actuate) the animated figure presented to the guests 100. For example, the control system 70 may receive data indicating that physical characteristics (e.g., current physical characteristics, real-time physical characteristics) of the real world outdoor environment 101 are that it is relatively hot and sunny (e.g., via a temperature and/or light sensor). As a result, the show effect system 60 may operate the animated figure based on the received physical characteristics. As an example, an animated figure may be operated to squint, fan itself, shade itself, comment about a hot weather environment, or any combination thereof.

Thus, the show effect system 60 may present an image having virtual elements that correspond to (e.g., mimic, represent, model, simulate, complement) any suitable real world element to immerse the guests 100 in a particular environment. Further, certain virtual elements may be modified to increase interest and immersion in a narrative. For example, a graphic sun may be illustrated realistically based on lighting detected within the real outdoor environment and also illustrated to include features that suggest the presence of a human face. Additionally or alternatively, virtual elements may be utilized to make an environment different than the real outdoor environment, wherein different than the real outdoor environment may include opposite of the real outdoor environment. For example, the sun may be presented when it is actually dark outside, or the moon may be presented when the moon is not actually visible in the outdoor sky.

Figure 3:
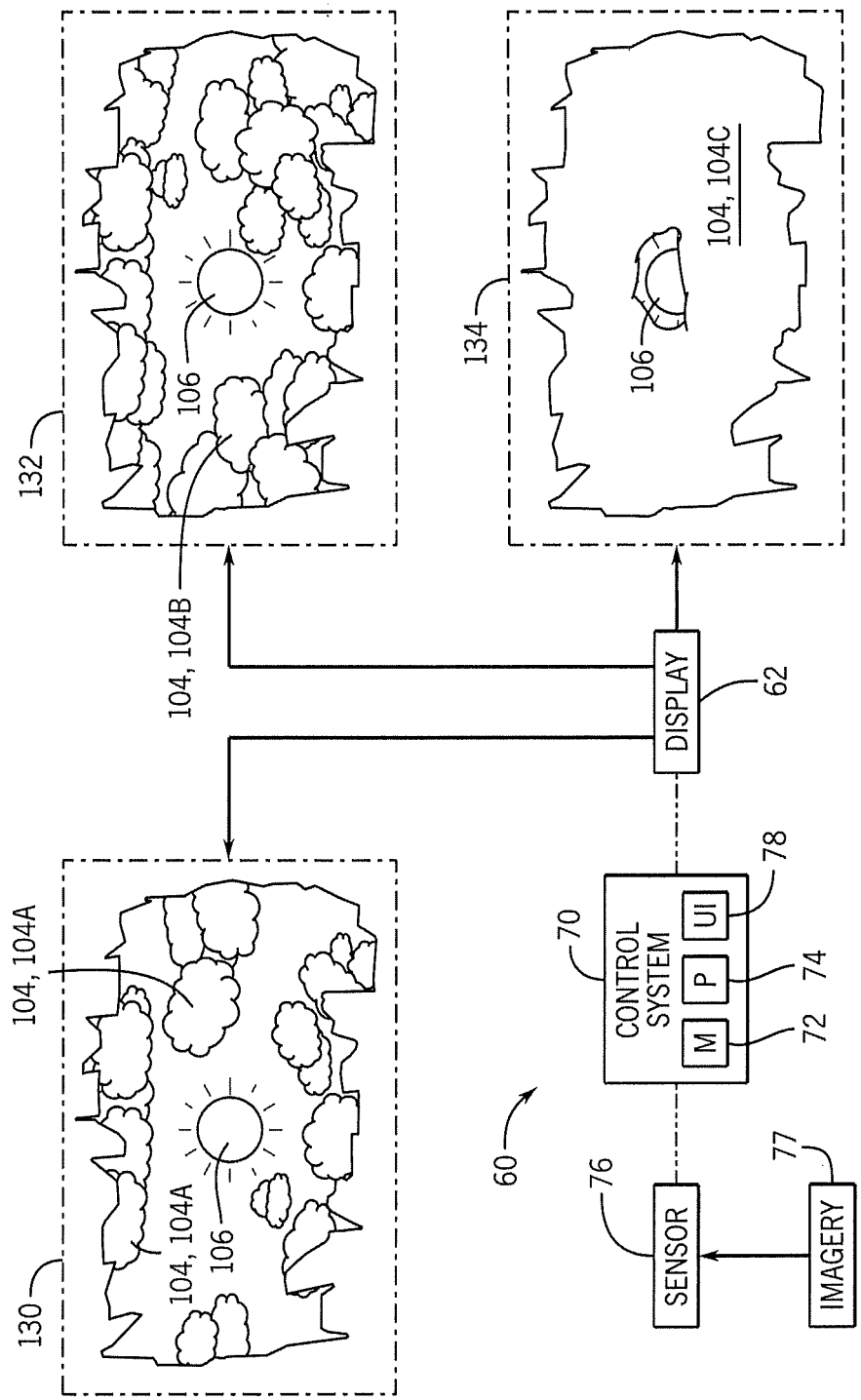
FIG. 3 is a schematic diagram of an embodiment of a show effect system configured to present an image, in accordance with an aspect of the present disclosure.

FIG. 3 is a schematic diagram of an embodiment of the show effect system 60. The show effect system 60 may cause presentation of different images of the real world outdoor environment for viewing by the guests. For example, the control system 70 may cause the display 62 to output a first image 130, a second image 132, and a third image 134. Each of the images 130, 132, 134 may include the virtual clouds 104 and the virtual sun 106, and the virtual clouds 104 may have different appearances in the images 130, 132, 134. The first image 130 may include first virtual clouds 104A of a first class and a first population density. For example, the first virtual clouds 104A may include cumulus class clouds arranged at a relatively low population density. The second image 132 may include second virtual clouds 104B of the first class and a second population density, such as cumulus class clouds arranged at a relatively intermediate population density. The third image 134 may include third virtual clouds 104C of a second class and a third population density, such as stratus class clouds arranged at a relatively high population density. In each of the images 130, 132, 134, the virtual sun 106 may be central to the display 62.

In an embodiment, the control system 70 may cause the display 62 to output the images 130, 132, 134 based on data received from the sensor 76. For instance, the control system 70 may identify one or more visual characteristics associated with the real world elements in the imagery 77. For example, the control system 70 may identify a cloud class (e.g., cumulus, stratus, cirrus, cirrocumulus, cumulonimbus, altocumulus, altostratus, stratocumulus) in the imagery 77 received from the sensor 76. The cloud class may indicate various characteristics of an appearance of the clouds, such as whether the clouds are puffy, opaque, degree of transparency, wispy, powdered, and so forth. The control system 70 may also identify other visual characteristics, such as a relative color, shape and/or size of the real world clouds in the imagery 77. The control system 70 may also identify the population density of real world clouds in the imagery 77. The control system 70 may then generate image data to cause the display 62 to output one of the images 130, 132, 134 with the virtual clouds 104 having the identified visual characteristics, such as a class, color, shape, size, the population density, or any combination thereof, as identified from the received imagery 77. In one embodiment, the control system 70 may dynamically modify the generated image data based on the imagery 77 received from the sensor 76. For instance, the control system 70 may determine a change (e.g., an increase) in the population density of clouds in the received imagery 77 and generate image data reflective of the identified change (e.g., by increasing the number of clouds in the presented image). Similarly, the control system 70 may determine a change in the class of clouds in the received imagery 77 and generate image data reflective of the change in cloud class. In this manner, the control system 70 may provide updated image data to facilitate presentation of images that may more closely correspond to (e.g., mimic, represent, model, simulate, complement) the received imagery 77. However, narrative goals may be achieved by modifying the images 130, 132, 134. For example, even in dense cloud cover, the virtual clouds 104 may be presented in a manner such that the virtual sun 106 remains visible.

The control system 70 may maintain presentation of the virtual sun 106 in each of the images 130, 132, 134. In other words, regardless of the real world clouds identified in the imagery 77 received from the sensor 76 and/or whether the real world sun is contained within the received imagery 77, the control system 70 may generate image data that causes the display 62 to present the virtual sun 106. In an additional or alternative embodiment, the control system 70 may generate image data that causes the virtual clouds 104 to be superimposed over the virtual sun 106, thereby at least partially concealing visibility of the virtual sun 106. In such an embodiment, the image data generated by the control system 70 may cause the virtual sun 106 to be partially visible through the virtual clouds 104, such as by providing some illumination of the virtual sun 106 through the virtual clouds 104. The control system 70 may further generate image data that causes the display 62 to output images that appear to show movement of the virtual clouds 104 and/or the virtual sun 106. Thus, the image presented by the display 62 may more realistically portray an appearance of the sky over time.

Figure 4:
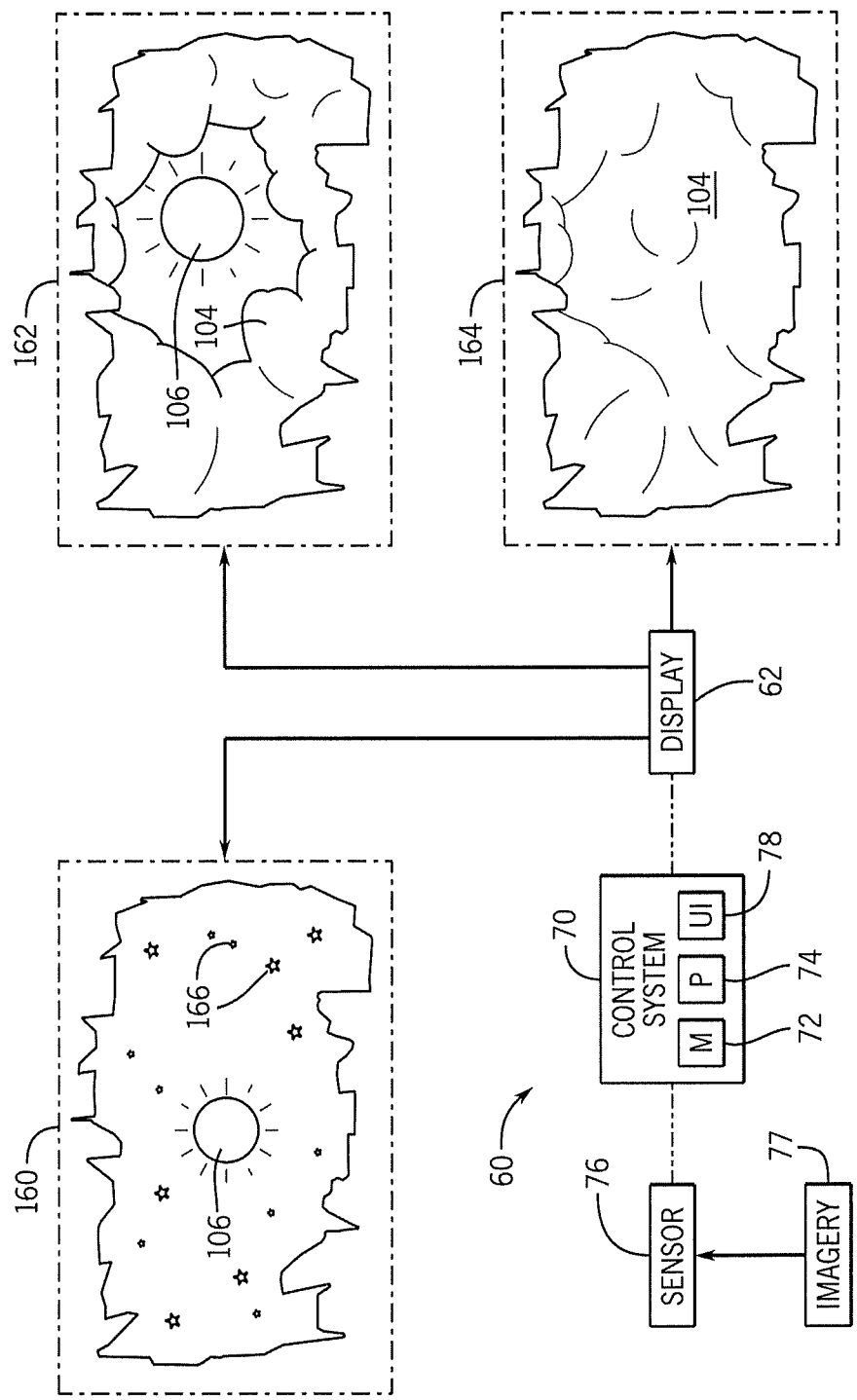
FIG. 4 is a schematic diagram of an embodiment of a show effect system configured to present an image, in accordance with an aspect of the present disclosure.

FIG. 4 is a schematic diagram of an embodiment of the show effect system 60 that causes presentation of a fourth image 160, a fifth image 162, and a sixth image 164 for the guests. The images 160, 162, 164 may have different digital scene appearances. The fourth image 160 and the fifth image 162 may portray the real world outdoor environment at different times of the day. As an example, the fourth image 160 may show the real world outdoor environment at a night time, and the fifth image 162 may show the real world outdoor environment at a day time. For instance, the control system 70 may determine the time of day based on data received from the sensor 76, such as via a timer directly indicating the time of day and/or via the imagery 77 that may indicate the time of day (e.g., based on an amount of lighting provided in the imagery 77). To portray the real world outdoor environment at a night time, the control system 70 may cause the display 62 to present a darker sky, along with stars 166, in the fourth image 160. To portray the real world outdoor environment at a day time, the control system 70 may cause the display 62 to present a brighter sky, along with different coloring of the virtual clouds 104 (e.g., a red hue to portray illumination of the virtual clouds 104 by a rising sun).

In an embodiment, the control system 70 may also cause the appearance of the virtual sun 106 to adjust in different images. As an example, the control system 70 may cause the virtual sun 106 to have an increased size in the fifth image 162 as compared to the virtual sun 106 in the fourth image 160. Additionally, the control system 70 may cause the virtual clouds 104 to conceal the virtual sun 106 (e.g., fully reduce visibility of the virtual sun 106) in the sixth image 164. Concealment of the virtual sun 106 may be based on the detected real world outdoor environment and/or based on operation of an amusement park system. For instance, in response to a determination that operation of the amusement park system is suspended (e.g., movement of a ride vehicle is stopped for repair or while guests are boarding or unloading), the control system 70 may conceal the virtual sun 106, as shown in the sixth image 164, to correlate with a theme in which the amusement park system is powered by the virtual sun 106. The control system 70 may further adjust other appearances (e.g., as output by the display 62) of the virtual sun 106, such as a brightness (e.g., lighting, luminance) of the virtual sun 106 and/or height positioning, in other images. Adjustment of the appearance of the virtual sun 106 may further provide realistic portrayal of the real world outdoor environment by varying the appearance of other virtual elements in addition to the virtual clouds 104 to correspond to (e.g., mimic, represent, model, simulate, complement) the real world outdoor environment.

In an additional or alternative embodiment, the control system 70 may cause the display 62 to output any of the images 130, 132, 134, 160, 162, 164 based on a user input, such as via the UI 78. For example, the user input may indicate a cloud class and/or a cloud population density, and the control system 70 may generate and output image data to cause the display 62 to present an image in accordance to the user indicated cloud class and/or the user indicated cloud population density, such as regardless of a determined cloud class and/or a determined cloud population density of the imagery 77 received from the sensor 76. The control system 70 may further adjust (e.g., modify) other parameters of the images, such as an appearance of the virtual sun 106 and/or a time of day presented in the images, based on the user input. As such, the control system 70 may cause the display 62 to present images based on a combination of user inputs and determined parameters. In this way, the virtual environment can be gradually transitioned from what correlates to the real world outdoor environment to an environment in alignment with a narrative. For example, when it is raining in the real world outdoor environment, the virtual environment may transition from a rainy appearance to a sunny day to give the impression of experiencing the ride on a sunny day that more suitably fits with a ride theme.

In some embodiments, the control system 70 may utilize the characteristics (e.g., received and/or detected characteristics) associated with the real world outdoor environment in combination with the imagery 77 and/or user inputs to output any of the images 130, 132, 134, 160, 162, 164. The characteristics may enhance the generated images and provide for an increase in similarity between the real world outdoor environment and the resulting images and/or virtual elements contained within the images. As such, virtual characteristics of the image may more closely correspond to actual physical characteristics (e.g., a reality, an appearance, a real life experience) of the real world outdoor environment, and the images visible to the guests may more closely portray aspects of the real world outdoor environment.

Figure 5:
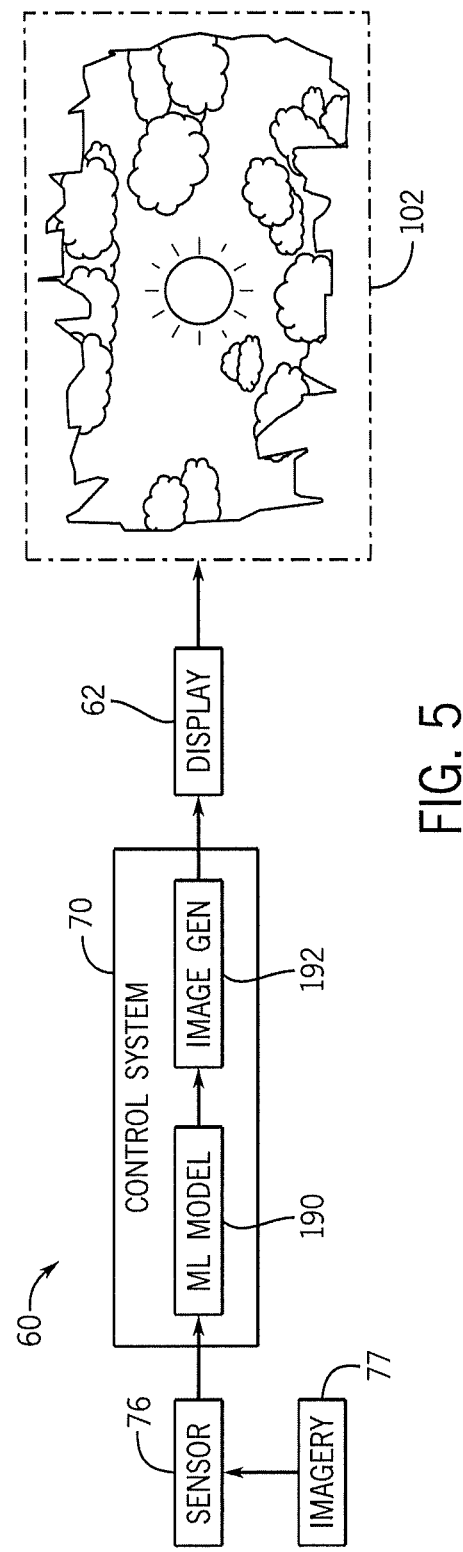
FIG. 5 is a schematic diagram of an embodiment of a show effect system configured to present an image, in accordance with an aspect of the present disclosure.

FIG. 5 is a schematic diagram of an embodiment of the show effect system 60. The control system 70 of the illustrated show effect system 60 may utilize machine learning (e.g., supervised machine learning, unsupervised machine learning) to generate image data that causes the display 62 to present images. As used herein, machine learning refers to algorithms and statistical models that the control system 70 may use to perform a specific task without using explicit instructions, relying instead on patterns and inference. In particular, machine learning generates a mathematical model based on data (e.g., sample or training data, historical data) in order to make predictions or decisions without being explicitly programmed to perform the task. For example, machine learning may be used to generate image data based on the imagery 77 received from the sensor 76. The control system 70 may use the patterns associated with the machine learning to generate the image data based on the received imagery 77, such as by determining a cloud class and/or a cloud population density.

In an embodiment, such as when particular known examples exist that correlate to future predictions that the control system 70 will be tasked with generating, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Further, similarity learning is an area of supervised machine learning closely related to regression and classification, but the goal is to learn from examples using a similarity function that determines the extent in which two objects are similar or related.

Additionally, or alternatively, in some situations, it may be beneficial for the control system 70 to utilize unsupervised learning (e.g., when particular output types are not known). Unsupervised learning algorithms take a set of data that contains only inputs, and find structure in the data, such as grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

As a result of implementation of machine learning, the control system 70 may include a machine learning model 190, which may be stored in the memory of the control system 70, for example. The control system 70 may also include image generation circuitry 192, which may be a part of the processing circuitry of the control system 70. The control system 70 may use the machine learning model 190 and the image generation circuitry 192 to cause (e.g., instruct) the display 62 to output the image 102 as desired. By way of example, the machine learning model 190 may receive the imagery 77 from the sensor 76 as an input and determine various parameters, such as a real world cloud class and/or a real world cloud population density, from the imagery 77. The machine learning model 190 may provide the determined parameters as an output to the image generation circuitry 192. The image generation circuitry 192 may generate image data based on the parameters received from the machine learning model 190. For instance, the image generation circuitry 192 may generate image data having virtually generated clouds that correspond to the cloud class, cloud appearance, and/or the cloud population density as that determined by the machine learning model 190. Thus, virtual elements of the image data may correspond to (e.g., mimic, represent, model, simulate, complement) the real world elements of the imagery 77 provided by the sensor 76. The display 62 may receive the image data generated via the image generation circuitry 192 and output the image 102 for presentation based on the image data. In this way, the control system 70 may utilize the machine learning model 190 to cause the display 62 to present the image 102 automatically (e.g., without user input) based on the imagery 77 received from the sensor 76.

Additionally or alternatively, in some embodiments, the control system 70 may utilize the physical characteristics (e.g., received and/or detected characteristics as described herein) associated with the real world outdoor environment in combination with the imagery 77 to generate the image 102 (e.g., automatically). The characteristics may enhance the generated image 102 and provide for an increase in similarity between the real world outdoor environment and the resulting image 102 and/or virtual elements contained within the image 102. As such, virtual characteristics of the image 102 may more closely correspond to actual physical characteristics (e.g., a reality, an appearance, a real life experience) of the real world outdoor environment, and the image 102 visible to the guests may more closely portray aspects of the real world outdoor environment.

Each of FIGS. 6-8 described below illustrates a respective method or process associated with operation of the show effect system 60. In an embodiment, each of the methods may be performed by a single respective component or system, such as by the control system 70 (e.g., the processing circuitry 74). In an additional or alternative embodiment, multiple components or systems may perform the operations for a single one of the methods. It should also be noted that additional operations may be performed with respect to the described methods. Moreover, certain operations of the depicted methods may be removed, modified, and/or performed in a different order. Further still, the operations of any of the respective methods may be performed in parallel with one another, such at the same time and/or in response to one another.

Figure 6:
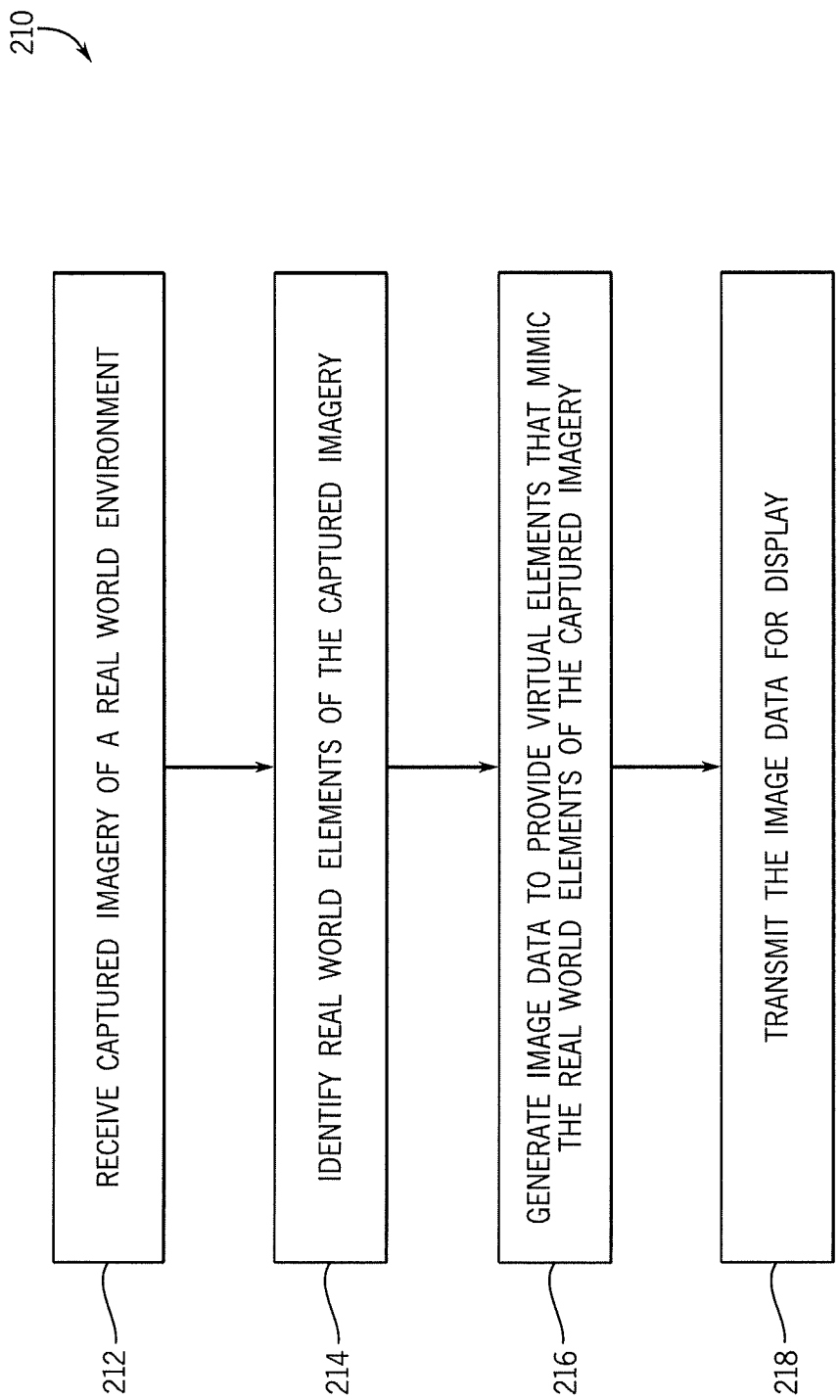
FIG. 6 is a flowchart of a method or process for operating a show effect system to present an image, in accordance with an aspect of the present disclosure.

FIG. 6 is a flowchart of an embodiment of a method 210 for operating a show effect system to present an image. At block 212, captured imagery of a real world environment may be received, such as from a sensor (e.g., an optical sensor). For example, the imagery may include one or more images of an outdoor environment surrounding the show effect system, such as a view of the sky. At block 214, real world elements of the captured imagery may be identified. By way of example, a class of the real world elements (e.g., a class of clouds of a sky or surrounding foliage), an appearance of the real world elements (e.g., a color, size, shape, visual characteristics), and/or a population density (e.g., a quantity of clouds or trees within the captured imagery) may be identified.

At block 216, image data may be generated to provide virtual elements that correspond to (e.g., mimic, represent, model, simulate, complement) the appearance of the real world elements identified from the captured imagery. As an example, the virtual elements of the image data may be stylized to correspond to the appearance of the real world elements, such as based on an identified class (e.g., oak tree, fir tree) or other appearance characteristic (e.g., leaf coloring) of the real world elements. As another example, the population density of virtual elements in the image data may be based on the population density of the real world elements in the captured imagery. That is, the quantity of real world elements in the captured imagery may correspond to the population density of the real world elements. In an embodiment, the captured imagery may be determined as being devoid of a target real world element. In response, the generated image data may also be devoid of virtual elements corresponding to the target real world element. Thus, the virtual elements of the image data may more closely correspond to current real world elements indicated by the captured imagery.

Additionally or alternatively, in some embodiments, the image data may be generated to provide virtual elements that include virtual characteristics based on identified characteristics associated with the real world elements identified from the captured imagery. As discussed herein, a characteristic and/or feature associated with the identified real world element may be identified (e.g., determined) from the captured imagery. Furthermore, virtual characteristics of the virtual elements may be based on the identified characteristics. As an example, the identified real world element may include a cloud, and the identified characteristics of the cloud may include a relative size measurement of the cloud, density of the cloud, color of the cloud, and/or movement of the cloud within the captured imagery. Furthermore, the generated image data may include a virtual element having similar virtual characteristics as the identify characteristics associated with the cloud, though the virtual element may not match a type of the real world element. Continuing with the example, a virtual element may include a group of butterflies having a similar size, density, color, and/or movement as that of the cloud. As such, the displayed image resulting from the image data may include virtual elements, such as the group of butterflies, having a similar appearance as the identified real world elements, such as the cloud.

In one embodiment, the image data may be newly generated, such as without using pre-existing image data. That is, each virtual element may be newly generated based on the captured imagery without utilizing a pre-set virtual element (e.g., a previously generated virtual element). In an additional or alternative embodiment, the image data may be generated by modifying an existing image (e.g., a canned image, a stock image). For example, the existing image may include pre-set virtual elements, and the pre-set virtual elements may be adjusted based on the real world elements identified from the captured imagery. For example, virtual models of trees or clouds may be provided, and the coloring may be adjusted based on detected coloring in the real environment. In either embodiment, the virtual elements of the image data may be populated based on the identified type and/or class, the identified population density, and/or any other suitable parameter associated with the captured imagery. For instance, a quantity of pixels and/or a percentage of a total quantity of pixels of the image data may be assigned to be a virtual element based on the captured imagery.

The image data being generated may also provide virtual elements that appear to interact with one another and/or with other aspects of a digital scene. By way of example, the virtual elements of the image data may include trees and/or clouds that cast a shadow based on a positioning of the trees and/or of the clouds with respect to a remainder of the digital scene and/or based on a direction of lighting in the digital scene. Such digital content may be procedurally generated. For instance, the image data may initially by generated to include the virtual elements to correspond to (e.g., mimic, represent, model, simulate, complement) the captured imagery, and the image data may then be modified to adjust the appearance of the virtual elements. As such, the image data initially generated based on the captured imagery may be further refined to cause the virtual elements to appear more realistic.

At block 218, the generated image data (e.g., with procedurally generated digital content) may be transmitted for presentation (e.g., display) in a ride environment or other attraction. As an example, the image data may be transmitted to a display to cause the display to present an image based on the image data. The presented image may include the virtual elements that correspond to (e.g., mimic, represent, model, simulate, complement) the real world elements of the captured imagery. Thus, the image in the attraction may appear to match, blend, or merge with the real world environment and provide a more realistic image based on detected real world conditions. In some embodiments, the image data may include modifications to provide elements of interest (e.g., virtual trees may be depicted with human characteristics or may be depicted as moving vigorously despite no such movement in the actual outdoor environment).

Figure 7:
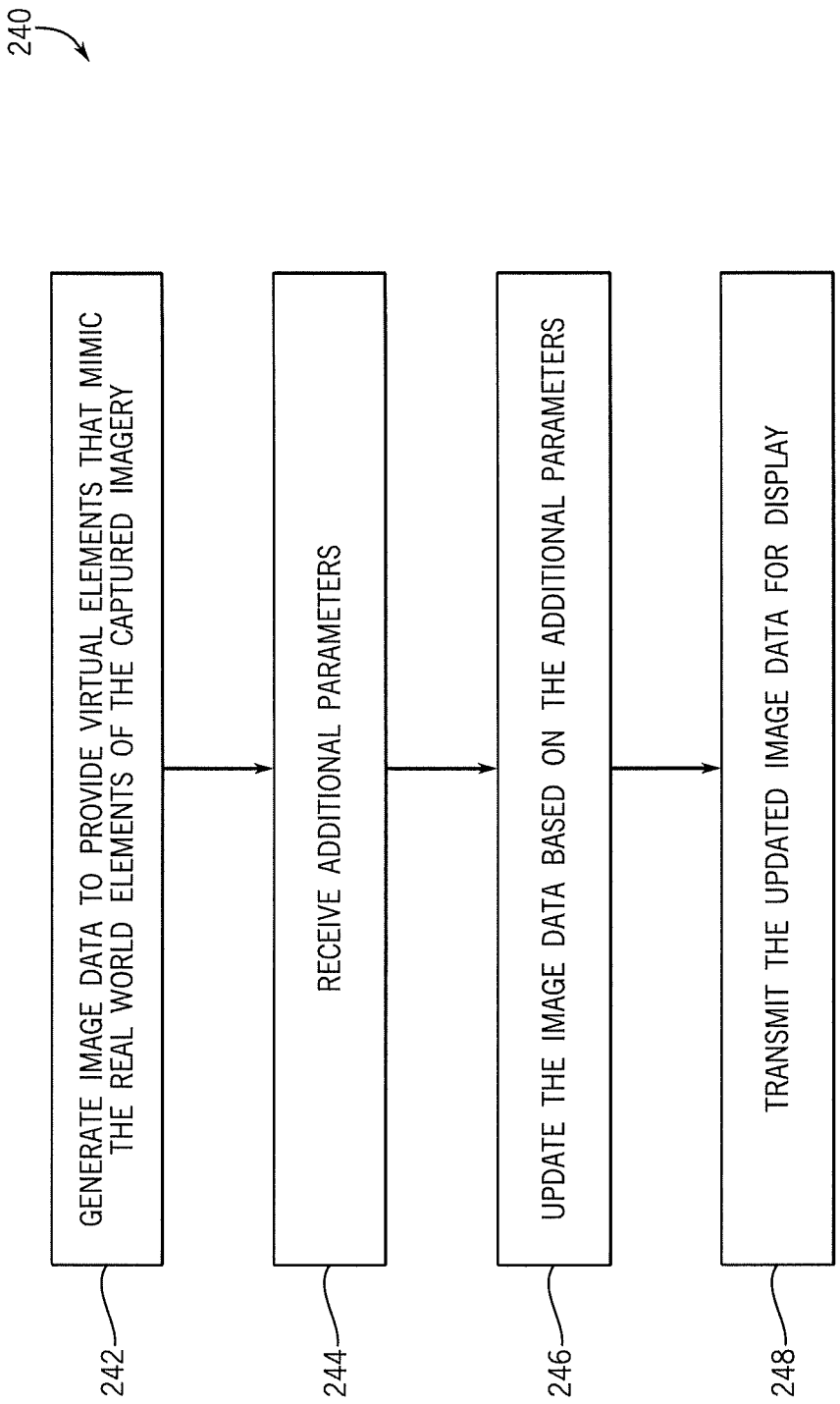
FIG. 7 is a flowchart of a method or process for operating a show effect system to present an image, in accordance with an aspect of the present disclosure.

FIG. 7 is a flowchart of an embodiment of a method 240 for operating a show effect system to present an image. For example, the method 240 may be performed to enhance the image data generated via the method 210. At block 242, image data may be generated based on captured imagery, and virtual elements of the image data may correspond to (e.g., mimic, represent, model, simulate, complement) real world elements of the captured imagery, such as via the techniques described above. At block 244, additional parameters may be received. The additional parameters may include a time of day, a precipitation condition, a temperature, a humidity, and the like. The additional parameters may be received via a sensor and/or via other sources, such as from the Internet and/or from a user input.

At block 246, the generated image data may be updated based on the additional parameters. As an example, an illumination of the virtual elements, such as an intensity of illumination, a direction of illumination (e.g., to simulate positioning of the sun), a color of illumination, and so forth may be adjusted. As another example, additional virtual elements that correspond to precipitation, such as rain, snow, sleet, and the like, may be added based on an identified presence of precipitation in the real world environment. As a further example, other adjustments may be made to the image data, such as a distortion of the virtual element (e.g., to simulate a hazy appearance during increased temperature conditions, to simulate a humid and/or polluted environment) in the image, an addition of other virtual elements (e.g., fog, lightning, stars) that may not be present in the captured imagery, and so forth. The updates made to the image data may therefore be based on supplemental information that may not directly correspond to (e.g., mimic, represent, model, simulate, complement) the real world elements of the captured imagery, but may nonetheless facilitate providing a realistic representation of a real world environment. At block 248, upon updating the image data, the updated image data may be transmitted to a display to present an image based on the updated image data.

Additionally or alternatively, the generated image data may be updated based on received and/or detected physical characteristics associated with the real world environment. For example, data may be received indicating that physical characteristics (e.g., current physical characteristics, real-time physical characteristic) of the real world environment are that it is relatively cold and dark. As a result, the image data (e.g., a virtual element of the image data) may be updated based the received physical characteristics. As an example, a virtual element of the image data may include a human-like figure, and the virtual element may be updated to portray the human-like figure to be shivering and/or speaking about a cold and/or dark weather environment. In this way, the display of the image data (e.g., the virtual element) may more closely correspond to the actual real-life aspects of the real world environment.

As briefly discussed herein, in some embodiments an animated figure (e.g., a prop, robot) may be operated based on received and/or detected physical characteristics associated with the real world environment. As an example, data may be received indicating that physical characteristics (e.g., current physical characteristics, real-time physical characteristic) of the real world environment are that it is relatively cold and dark. As a result, the animated figure may be operated based the received physical characteristics. As an example, an animated figure may be operated to shiver and/or comment about a cold and/or dark weather environment. In this way, the show effect system may more closely correspond to the real-life aspects of the real world environment.

It should be noted that the methods 210, 240 may be continually performed to enable image data to be dynamically generated for transmission to present an image. Thus, the image presented (e.g., via a display) based on the image data may be continually updated, such as based on newly captured imagery, to more closely correspond to (e.g., mimic, represent, model, simulate, complement) a real world environment. For example, the appearance of the virtual elements may be adjusted over time based on the detected real world elements of the captured imagery.

Moreover, an appearance of the virtual elements may also be based on other parameters that are not directly related to a detected parameter of the real world environment. As an example, the virtual elements may be stylized based on a theme of the amusement park and/or the attraction system in which the show effect system is implemented. For instance, first virtual elements presented by a first show effect system may have a more cartoon-like appearance, and second virtual elements presented by a second show effect system may have a more realistic appearance. Indeed, even though the same captured imagery may be received by different show effect systems, the virtual elements presented by the show effect systems may appear differently from one another. In other words, virtual elements generated based on the same type and/or class and/or the same population density associated with captured imagery may have different appearances for different show effect systems. Thus, the image presented by each show effect system may be more tailored to its particular implementation.

Figure 8:
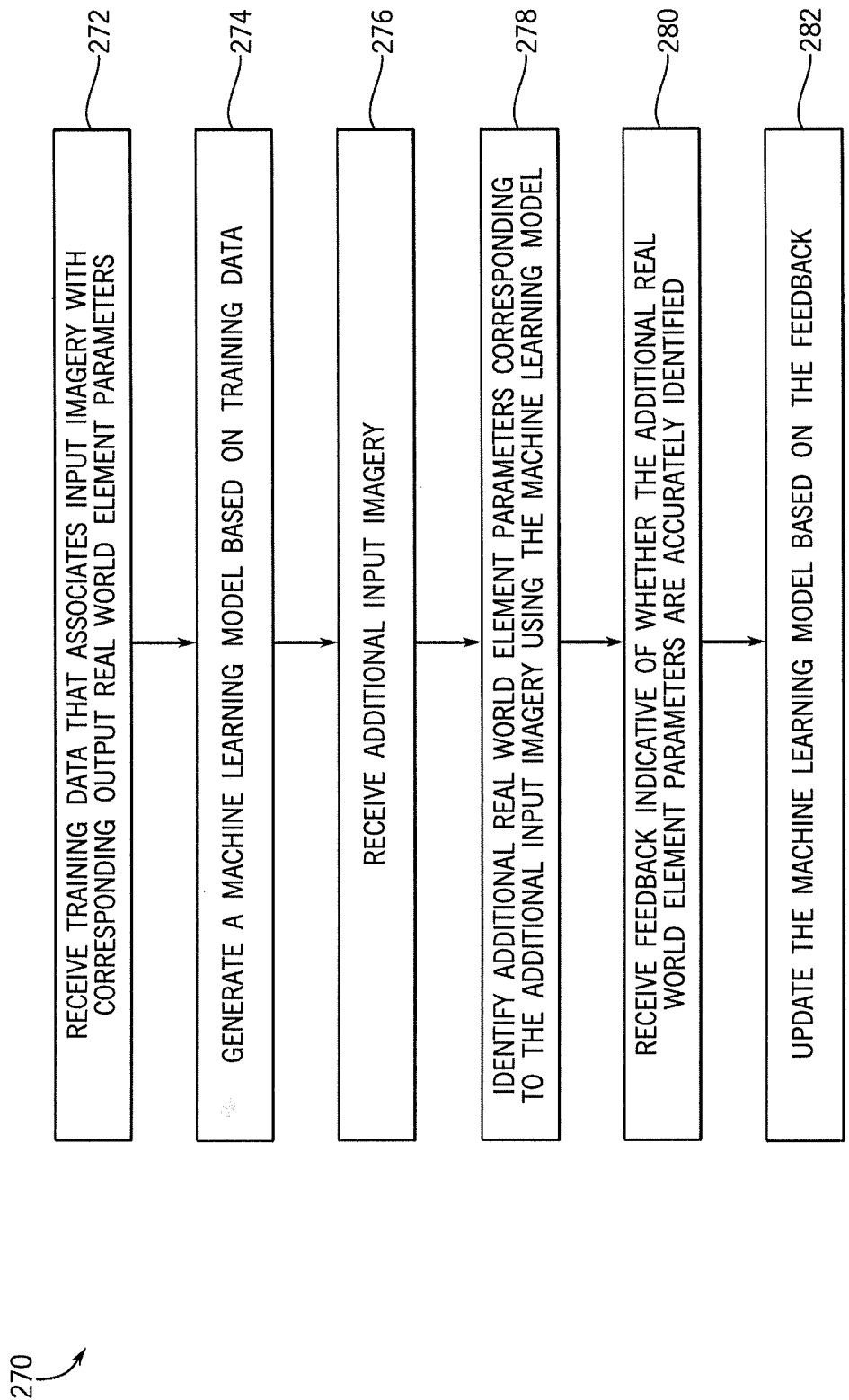
FIG. 8 is a flowchart of a method or process for operating a show effect system to present an image, in accordance with an aspect of the present disclosure.

FIG. 8 is a flowchart of an embodiment of a method 270 for operating a show effect system to generate a machine learning model to be utilized for presenting images based on captured imagery. At block 272, training data that associates input imagery with corresponding output real world element parameters are received. The training data may, for example, include a first quantity of input imagery that may be manually assigned to the real world element parameters. For instance, each input imagery may be of the sky, and the real world element parameters may include cloud class and/or cloud population density.

At block 274, a machine learning model may be generated based on the training data. As an example, characteristics of the input imagery, such as raw pixel data (e.g., pixel coloring), may be identified to determine a relationship between such characteristics and the associated real world element parameters. Thus, an algorithm defining the relationship between the characteristics and the real world element parameters may be determined and established in the machine learning model.

At block 276, additional input imagery may be received to further train the machine learning model. That is, the additional input imagery may be utilized to determine whether the generated machine learning model operates properly to generate real world element parameters. To this end, such additional input imagery may be different from the input imagery and may not include assigned real world element parameters. In an embodiment, a second quantity of additional input imagery (e.g., 100 images, 200 images, 300 images) used to adjust the machine learning model may be less than the first quantity (e.g., 700 images, 800 images, 900 images, 1,000 images) of input imagery used to initially establish the machine learning model. In an alternative embodiment, the second quantity of additional input imagery may be the same as or greater than the first quantity of input imagery.

At block 278, the machine learning model is used to identify additional real world element parameters corresponding to the additional input imagery. That is, the additional input imagery may be used as an input for the machine learning model, and the machine learning model may generate the additional real world element parameters as outputs for the additional input imagery. The additional real world element parameters may then be analyzed, such as manually analyzed by a user, to determine whether the generated, additional real world element parameters are accurate.

At block 280, feedback indicative of whether the additional real world element parameters are accurately identified may be received. For example, a user may provide user input regarding whether the respective, additional real world element parameters have been accurately identified for each additional input imagery. The feedback may, for example, confirm an additional real world element parameter has been accurately identified, indicate an additional real world element parameter has not been accurately identified, and/or directly indicate the accurate real world element parameter.

At block 282, the machine learning model may then be updated based on the feedback. As an example, in response to receiving feedback that an additional real world element parameter associated with the additional input imagery has not been accurately identified, the algorithm of the machine learning model may be adjusted such that the machine learning model may more closely identify the accurate additional real world element parameter associated with the additional input imagery. As another example, in response to receiving feedback that an additional real world element parameter associated with additional input imagery has been accurately identified, the algorithm of the machine learning model may be more robustly maintained (e.g., less susceptible to adjustment) such that the real world element parameter may be similarly identified for similar imagery. In this manner, the machine learning model may be updated based on the received feedback to identify real world element parameters that may more accurately reflect subsequently received imagery.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for an attraction, the system comprising:
a sensor configured to capture imagery of a real world environment; and
a control system communicatively coupled to the sensor, wherein the control system is configured to:
receive the imagery captured by the sensor;
identify a population density associated with one or more real world clouds depicted within the imagery of the real world environment;
identify a cloud class of a plurality of cloud classes, wherein the cloud class is associated with the one or more real world clouds;
generate image data that comprises one or more virtual clouds that visually correspond to the one or more real world clouds based on the population density and the cloud class; and
transmit the image data and cause presentation of virtual imagery in the attraction based on the image data.

2. The system of claim 1, wherein the control system is configured to identify real world foliage depicted in the imagery, and identify a class of the real world foliage; and wherein the image data comprises data for providing virtual foliage that visually corresponds to the real world foliage based on the class of the real world foliage identified from the imagery.

3. The system of claim 1, wherein the image data comprises data corresponding to a digital scene, and wherein the control system is configured to:
identify a reposition of the one or more real world clouds; and
modify the image data by modifying a position of the one or more virtual clouds to visually correspond to the one or more real world clouds and with respect to the digital scene based on identifying the reposition of the one or more real world clouds.

4. The system of claim 1, wherein the control system is configured to determine a visual characteristic of the one or more real world clouds within the imagery, and wherein the image data comprises the one or more virtual clouds that visually correspond to the one or more real world clouds based on the visual characteristic.

5. The system of claim 1, wherein the control system is configured to:
determine a time of day associated with the imagery; and
modify lighting, color, or both of the one or more virtual clouds based on the time of day.

6. The system of claim 1, comprising a display in the attraction, wherein the control system is configured to transmit the image data to the display, and wherein the display is configured to display an image of the one or more virtual clouds in the attraction based on the image data.

7. The system of claim 4, wherein the visual characteristic comprises a coloring, a size, a degree of transparency, movement, or a shape of the one or more real world clouds.

8. The system of claim 1, wherein the plurality of cloud classes comprises a puffy cloud class, an opaque cloud class, a wispy cloud class, a powdered cloud class, or any combination thereof.

9. A non-transitory, computer-readable medium comprising instructions that, when executed by processing circuitry, cause the processing circuitry to:
receive captured imagery;
identify a first population density of one or more real world clouds depicted in the captured imagery;
identify a first cloud class of the one or more real world clouds depicted in the captured imagery:
generate image data having one or more virtual clouds that visually correspond to the one or more real world clouds based on the first population density and the first cloud class; and
output the image data to cause presentation of the one or more virtual clouds.

10. The non-transitory, computer-readable medium of claim 9, wherein the instructions, when executed by the processing circuitry, cause the processing circuitry to generate the image data having one or more additional virtual clouds.

11. The non-transitory, computer-readable medium of claim 10, wherein the instructions, when executed by the processing circuitry, cause the processing circuitry to:
identify a second population density of one or more additional real world clouds depicted in the captured imagery;
identify a second cloud class of the additional one or more real world clouds depicted in the captured imagery; and
generate the image data having the one or more additional virtual clouds that visually correspond to the one or more additional real world clouds based on the second population density and the second cloud class.

12. The non-transitory, computer-readable medium of claim 9, wherein the instructions, when executed by the processing circuitry, cause the processing circuitry to:
receive training data that associates input imagery with a corresponding population density and a corresponding cloud class of one or more respective real world clouds depicted within the input imagery; and
generate a machine learning model based on the training data.

13. The non-transitory, computer-readable medium of claim 12, wherein the instructions, when executed by the processing circuitry, cause the processing circuitry to:
receive additional input imagery;
use the machine learning model to identify an additional corresponding population density and an additional corresponding cloud class of one or more additional real world clouds of the additional input imagery;

receive feedback indicative of whether the additional corresponding population density and the additional corresponding cloud class is accurately identified; and update the machine learning model based on the feedback.

14. The non-transitory, computer-readable medium of claim 12, wherein the instructions, when executed by the processing circuitry, cause the processing circuitry to use the machine learning model to identify the first population density of the one or more real world clouds and the first cloud class of the one or more real world clouds depicted in the captured imagery.

15. The non-transitory, computer-readable medium of claim 9, wherein the instructions, when executed by the processing circuitry, cause the processing circuitry to identify a presence of precipitation in a real world environment associated with the captured imagery; and wherein the image data comprises additional virtual elements visually corresponding to the precipitation.

16. A system, comprising:
a display configured to present images; and
a control system configured to perform operations, the operations comprising:
receiving imagery of a real world environment;
identifying a cloud class of one or more real world clouds depicted in the imagery;
identifying a visual characteristic of the one or more real world clouds depicted in the imagery;
generating image data comprising one or more virtual clouds that visually correspond to the one or more real world clouds based on the cloud class and the visual characteristic and an additional virtual object; and
transmitting the image data to the display.

17. The system of claim 16, wherein the additional virtual object comprises a virtual moon.

18. The system of claim 17, wherein the imagery comprises first imagery, and the control system is configured to perform operations comprising:
receiving second imagery of the real world environment;
identifying an additional visual characteristic of the one or more real world clouds depicted in the second imagery;
determining that the additional visual characteristic of the one or more real world clouds depicted in the second imagery are different from the visual characteristic of the one or more real world clouds depicted in the first imagery; and
generating updated image data by modifying the one or more virtual clouds of the image data based on the additional visual characteristic.

19. The system of claim 16, wherein the visual characteristic of the one or more real world clouds comprises a class of the clouds, a population density of the clouds, or both.

20. The system of claim 16, comprising a ride vehicle, wherein the display is configured to present the images to guests in the ride vehicle.

* * * * *